April 20, 1937. R. H. BEYER 2,077,915
BRAKE
Filed Oct. 16, 1930

INVENTOR.
RAYMOND H. BEYER
BY
*M. W. McConkey*
ATTORNEY

Patented Apr. 20, 1937

2,077,915

UNITED STATES PATENT OFFICE 2,077,915

BRAKE

Raymond H. Beyer, South Bend, Ind., assignor to Bendix Brake Company, South Bend, Ind., a corporation of Illinois Application October 16, 1930, Serial No. 489,025

13 Claims. (Cl. 188—18)

This invention relates to brakes, and is illustrated as embodied in improved braking means for the landing wheel of an airplane. An object of the invention is to provide an effective brake which can readily be housed inside of the wheel, for example inside of the wheel hub, and especially a brake adapted for use with a wheel of the type in which the pneumatic tire is mounted directly on the wheel hub, so that a tire of maximum air content with a minimum parisitic resistance may be used.

Preferably the brake friction means, which may be externally conical, is shiftable axially, and means operated by the axial shifting is arranged to expand the friction means, for example against a drum member (which may be conical also) preferably provided inside of the wheel hub. In the illustrated arrangement there are two pivotally-connected externally-conical shoes pivoted on a shiftable carrier in a novel manner such that they wrap against the drum with a self-energizing action to give a powerful braking action.

Various features of novelty relate to novel brake-operating means arranged within the axle, to improvements in the structure and mounting of the wheel, and to various other desirable constructions and arrangements which will be apparent from the following description of the illustrative brake shown in the accompanying drawing, in which.

Figure 1:
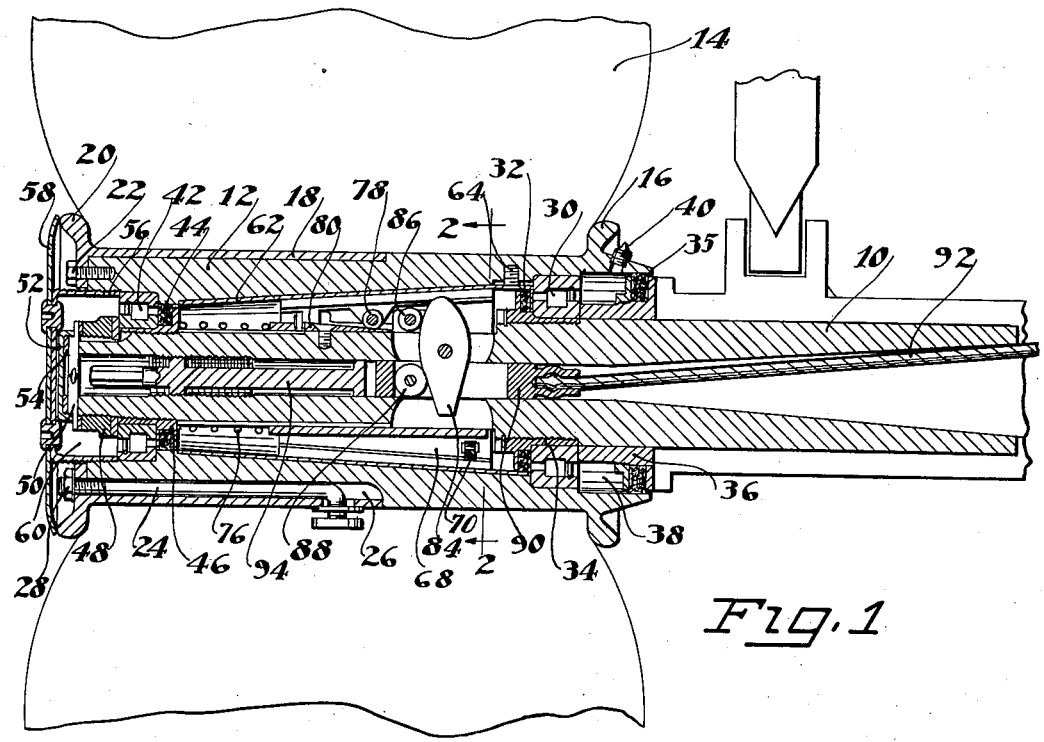
Figure 1 is a section diametrically through the wheel, axle, and brake.

The construction illustrated includes a short axle 10, ordinarily carried by a truss-like arrangement of three legs connecting it to the fuselage (not shown), on which is rotatably mounted a wheel consisting almost entirely of a hub 12 on which is directly mounted an encircling pneumatic tire 14 seated against a flange 16 on the hub. The tire is held by a ring 18 with a cooperating flange 20, the ring telescoping over the hub and being secured thereto by means such as screws 22. The tire is keyed to the hub by arranging its valve stem 24, of the laterally-extending type, in a groove 26 formed in the hub. The valve stem extends through ring 18 and has a nut 28 engaging the ring, so that it also holds the ring from turning.

The inner end of hub 12 is formed with a seat for an anti-friction roller bearing 30 mounted, with a felt grease-retaining washer 32, on a carrier 34 threaded onto the axle 10 so that it can be replaced as a unit, this being especially advantageous in making repairs in the field. A felt washer 35 encircling a bushing 36 mounted on the axle is arranged opposite bearing 30 and, with hub 12, defines an annular chamber 38 which may be packed with grease or other lubricant through a fitting 40 threaded into hub 12.

The outer end of the hub has a corresponding seat for a roller bearing 42 which, with a lubricant retainer or felt washer 44, is mounted on a flanged carrier 46 threaded on the axle near its end. The wheel and the two bearings are all locked on the axle by means such as a castellated nut 48 threaded on the end of the axle and held by a transverse key 50 seated in a groove across the end of the axle. The key in turn is held by a cap 52 threaded on the extreme end of the axle and having a gasket 54 sealing the end of the axle, which is hollow, to prevent any lubricant from getting into the brake.

An end or hub cap 56 threaded into the end of the hub may have an end plate 58 giving a flush or streamline effect to the end of the hub. The interior 60 of the hub cap may be packed with grease for the bearing 42.

Inside of the hub, between bearings 30 and 42 but sealed from them by felt washers or gaskets 32 and 44 to prevent the access of lubricant, is pressed a conical steel liner or brake drum member 62, secured by suitable means such as screws or the like 64.

The drum is engaged, to apply the brake, by friction-faced externally-conical shoes 66 and 68 connected by a floating pivot 70 and mounted by an anchor pivot 72 on an axially-movable carrier 74 splined on the axle 10. The carrier 74 is shifted to the left, in Figure 1, to apply the brake, against the resistance of a return spring 76 sleeved on the axle and confined between the carrier and the flanged end of carrier 46. When the carrier is so shifted, a roller or the like 78 on shoe 66 rides up on a hardened steel wedge 80 fastened to the axle, to expand the shoes against the resistance of return springs 82 acting on the shoes and urging them inwardly away from the drum.

The carrier 74 is shifted by means such as a thrust lever 84 pivoted crosswise of the axle in a transverse slot and engaging a roller or the like 86 on the carrier. The lever is operated by a roller 88 on a slide 90 in the bore of the hollow axle and operated by a cable or other tension element 92 extending to the brake pedal or its equivalent. The brake released position of the slide 90 is determined by adjustable means shown as a stop 94 threaded into the end of the bore in the axle, thus providing a readily-manipulated adjustment for the brake.

Figure 2:
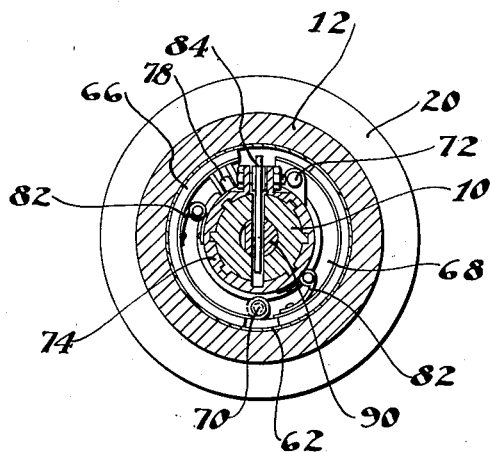
Figure 2 is a cross-section on the line 2—2 of Figure 1, with the tire removed.

It will be noted that pulling on the cable 92 shifts the friction means axially, and at the same time expands it. Due to the arrangement of anchor pivot 72 at the end of the band-like friction device 66—68, the friction means wraps against the drum with a self-energizing action (the drum turns counter-clockwise in Figure 2 when the plane is moving forward). As the wheels of an airplane landing gear practically never turn backward, the comparative ineffectiveness of the brake in reverse is not important.

While one illustrative embodiment has been described in detail, it is not my intention to limit the scope of the invention to that particular embodiment, or otherwise than by the terms of the appended claims.

I claim:

1. An axle having an expansible friction device mounted thereon, a tension operating element extending axially through said axle, and an operating part extending crosswise of said axle and connected to said element and arranged to expand the friction device.

2. An axle having a friction device shiftably mounted thereon, a tension operating element extending axially of said axle, and an operating lever extending crosswise through and pivoted on said axle and connected to said element and arranged to operate the friction device.

3. An axle having an axially-movable slide and provided with a brake-operating lever pivoted on said axle and operated by movement of said slide.

4. An axle having an axially-movable slide and provided with a pivoted brake-operating lever and operated by movement of said slide, and an adjustable stop engaged by said slide to determine the brake-released position of the lever.

5. An axle having an axially-movable slide and provided with a pivoted brake-operating lever and operated by movement of said slide, and a stop threaded in the end of the axle and engaged by said slide to determine the brake-released position of the lever.

6. An axially-movable carrier having pivoted thereon a pair of pivotally-connected externally-conical friction brake shoes.

7. An axially-movable carrier having a pair of pivotally-connected externally-conical friction brake shoes, in combination with an encircling conical brake drum member.

8. A brake mechanism comprising a hollow axle and a wheel hub closely encircling said axle, an expansible and contractible friction device in the space between said axle and said hub, means for transmitting braking torque from said device to the axle, and applying means including an axially-movable part within the hollow axle and a pivoted part extending through the axle and operated by the axially-movable part and arranged to expand said device against the inner surface of said hub.

9. A wheel and brake mechanism comprising a hollow axle and a small diameter wheel having a hub closely encircling and journaled on said axle, an expansible and contractible friction device in the space between said axle and said hub, means for transmitting braking torque from said device to the axle, and applying means within the hollow axle and having a part pivoted on and extending through the axle and arranged to expand said device against the inner surface of said hub.

10. A brake mechanism comprising an axle and a wheel hub closely encircling said axle, an expansible and contractible friction device in the space between said axle and said hub, means for transmitting braking torque from said device to the axle, applying means extending transversely of the axle between the ends of the friction device and operable to expand said device against the inner surface of said hub, and a tension cable extending axially through said axle and connected to the part of said means inside the axle.

11. A wheel and brake mechanism comprising an axle and a small diameter wheel having a hub closely encircling and journaled on said axle, an expansible and contractible friction device in the space between said axle and said hub, means for transmitting braking torque from said device to the axle, applying means extending transversely of the axle between the ends of the friction device and operable to expand said device against the inner surface of said hub, and a tension cable extending axially through said axle and connected to the part of said means inside the axle.

12. A wheel having about its axis a conical drum of considerable width approximating the width of the wheel and of a very steep angle approaching that of a cylinder, and friction means having a conical friction surface of a corresponding angle and which is movable axially and simultaneously expansible into engagement with said drum.

13. An axle having a brake drum journalled thereon, articulated friction means having spreadable ends, one of which ends is non-rotatably mounted on the axle and axially movable thereon, means for moving said friction means axially and means for moving the other end of the friction means into engagement with said drum simultaneously with said axial movement.

RAYMOND H. BEYER.